United States Patent [19]

Johnson

[11] Patent Number: 4,974,105
[45] Date of Patent: Nov. 27, 1990

[54] HAND-HELD TRANSDUCING DEVICE

[76] Inventor: Reynoll B. Johnson, 548 E. Cresent Dr., Palo Alto, Calif. 94301

[21] Appl. No.: 239,850

[22] Filed: Jul. 17, 1985

Related U.S. Application Data

[62] Division of Ser. No. 327,365, Dec. 4, 1981, Pat. No. 4,541,028.

[51] Int. Cl.$^5$ .......................... G11B 21/02; G11B 3/10
[52] U.S. Cl. .................................... 360/101; 360/106; 369/177
[58] Field of Search .............. 360/101, 106, 117, 137, 360/2; 369/75.1, 75.2, 77.1, 77.2, 177

[56] References Cited

U.S. PATENT DOCUMENTS

| | | | |
|---|---|---|---|
| 3,682,482 | 8/1972 | Holmes | 360/101 |
| 3,787,636 | 1/1974 | Brandt et al. | 360/101 |
| 3,825,268 | 7/1974 | Holland et al. | 369/177 |
| 3,855,620 | 12/1974 | Kato | 360/101 |

FOREIGN PATENT DOCUMENTS 2059666  4/1981  United Kingdom ............... 369/177

Primary Examiner—David J. Severin
Attorney, Agent, or Firm—Flehr, Hohbach, Test, Albritton & Herbert

[57] ABSTRACT

A hand-held transducing device for magnetically recording upon and playing from stationary records of a type adapted to be carried on back of a photograph or the like employs a rotating head for transducing information with respect to the record and means apart from the record for guiding the transducer to travel in a record trace while progressively varying the pitch of the head with respect to the track so as to vary the track density across the surface of the record, thereby extending the playing time of a record.

7 Claims, 5 Drawing Sheets

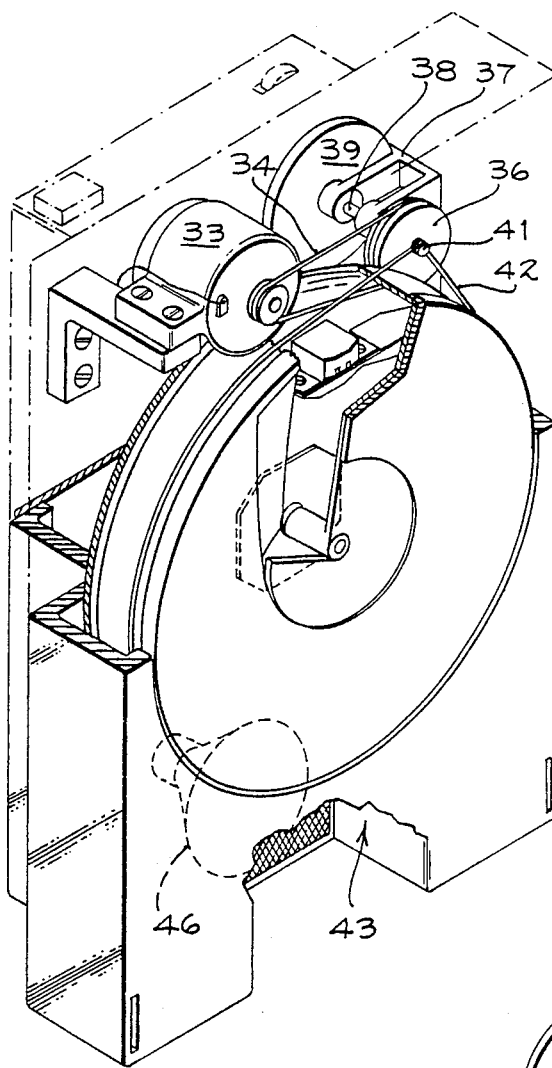
FIG_3
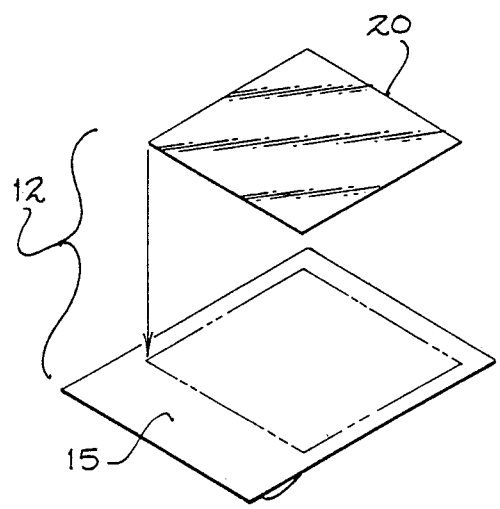
FIG_14
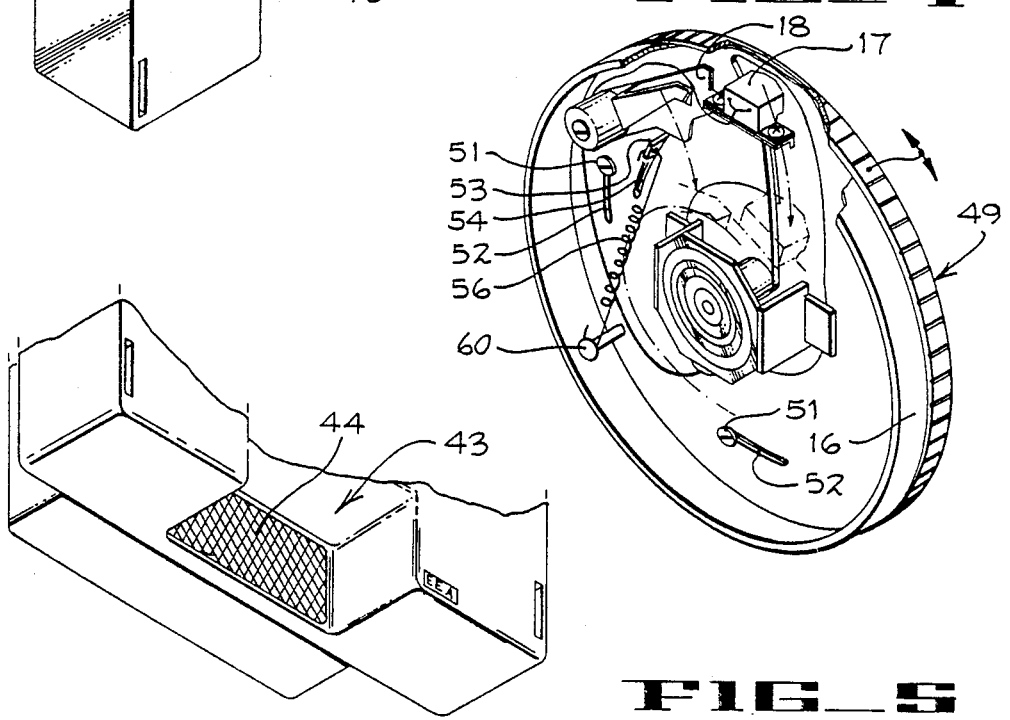
FIG_4
FIG_5

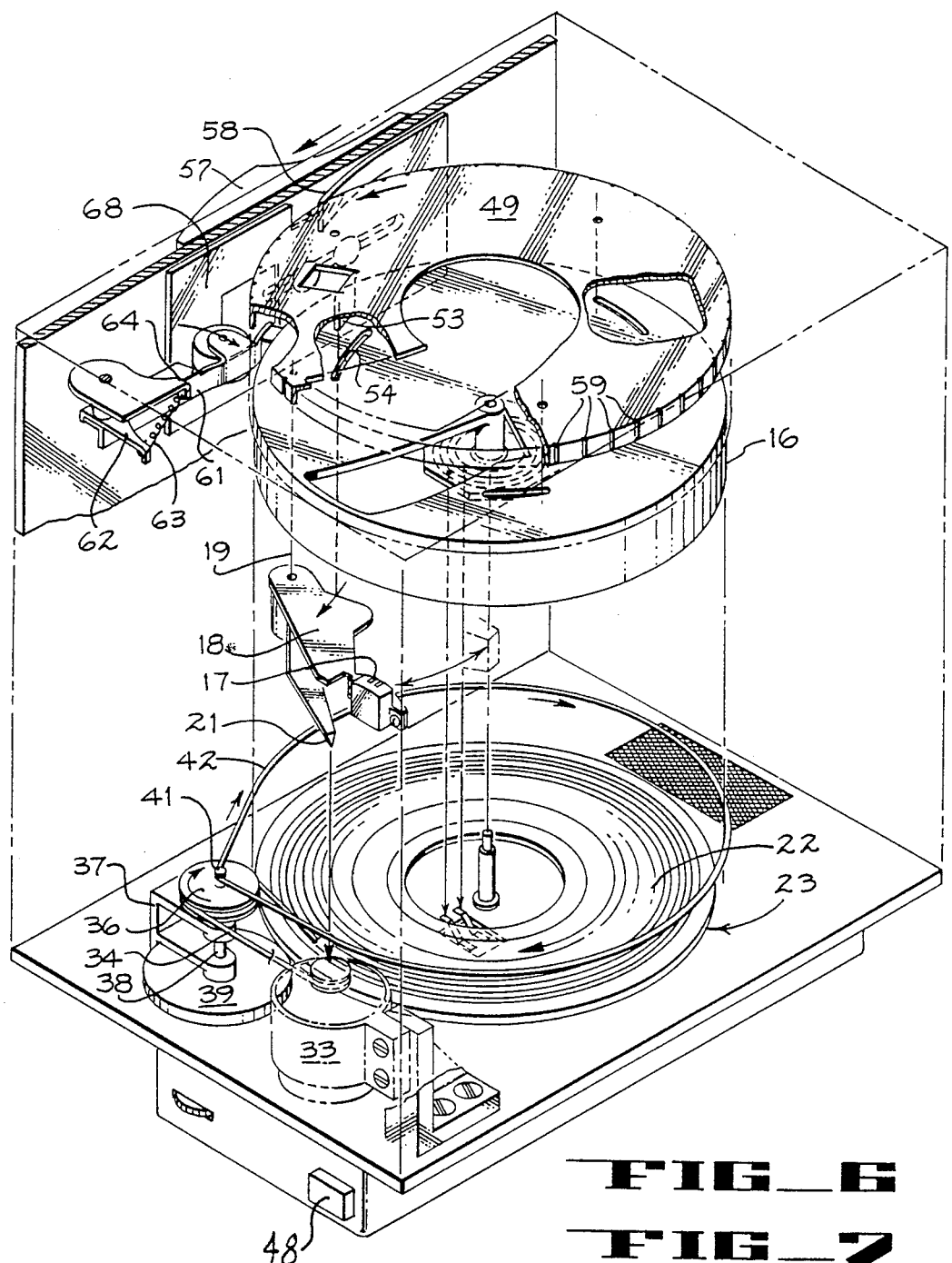
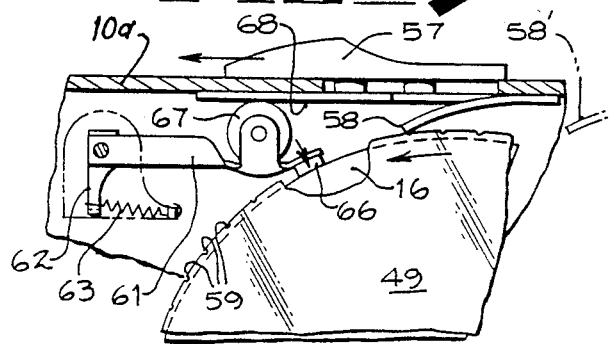
FIG_6
FIG_7

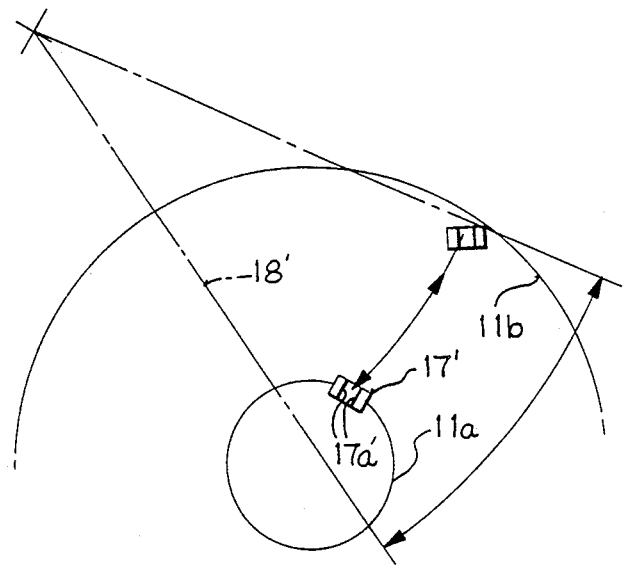
FIG_8
FIG_13
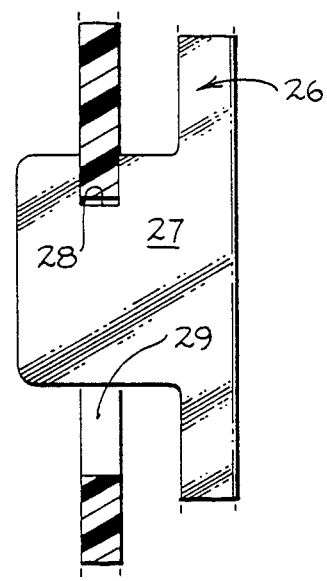

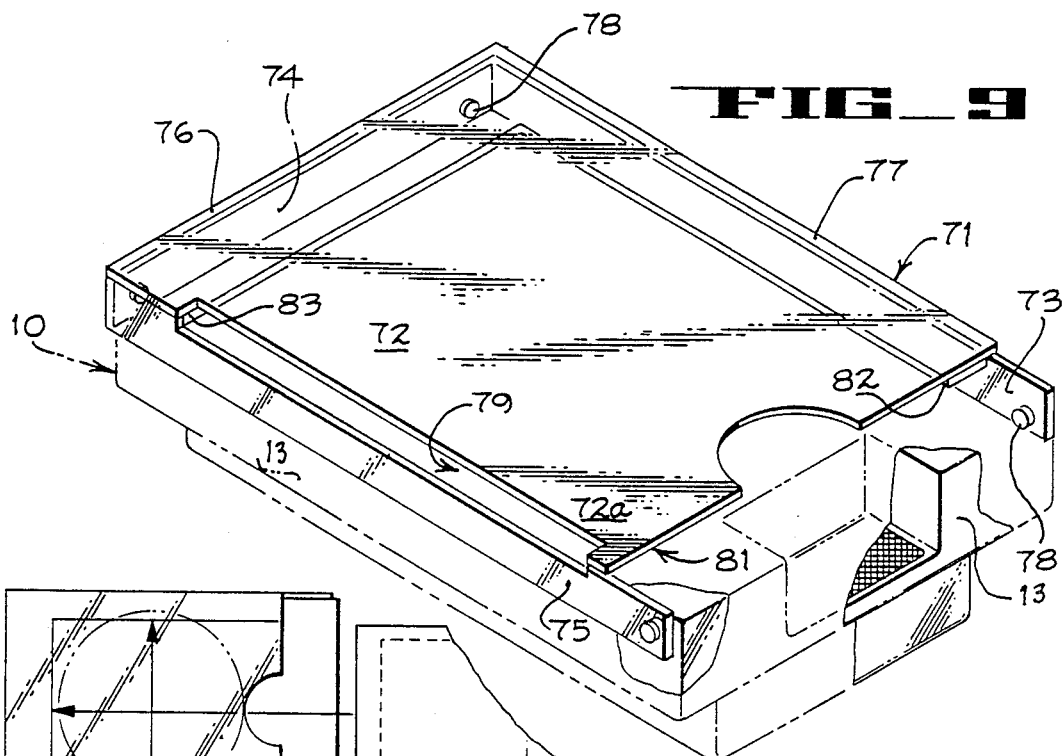
FIG_9
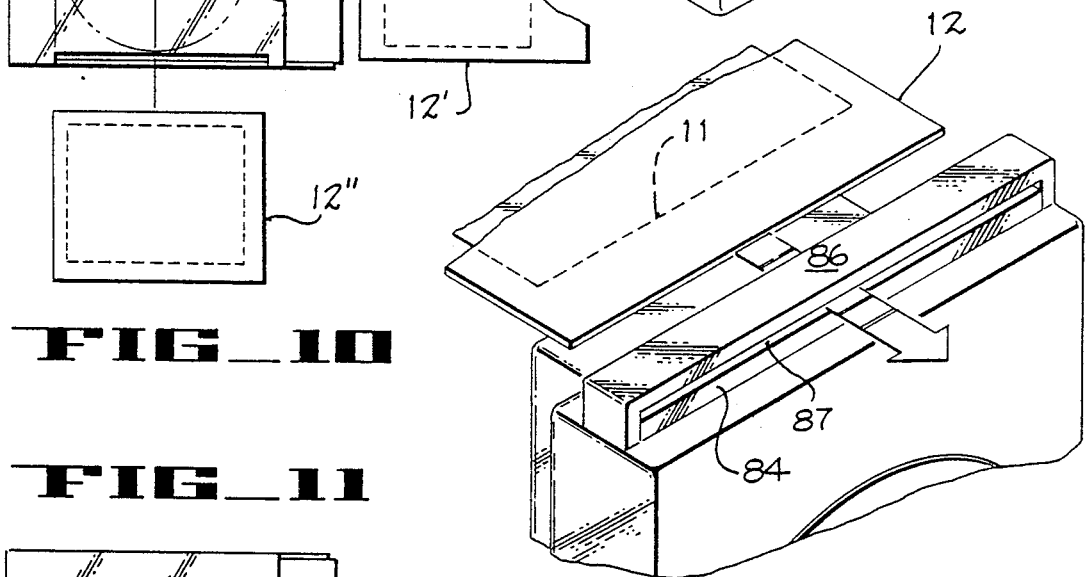
FIG_10
FIG_11
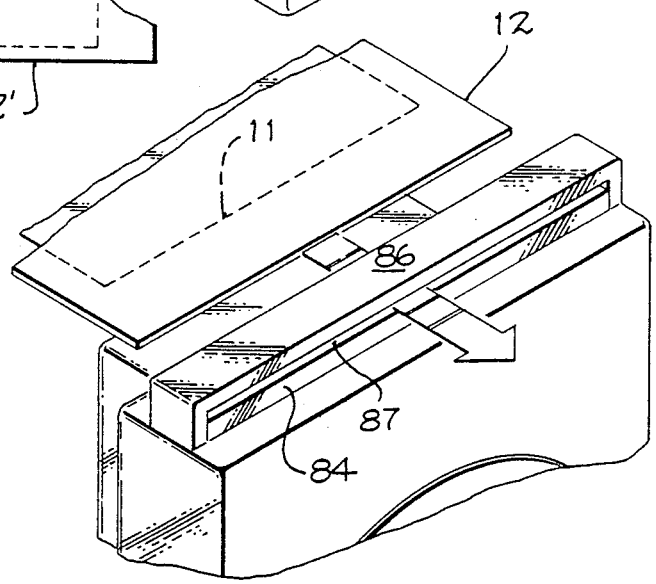
FIG_12

HAND-HELD TRANSDUCING DEVICE

This is a divisional application of my application Ser. No. 327,365 entitled HAND-HELD TRANSDUCING DEVICE FOR INSERTABLE RECORDS filed Dec. 4, 1981, in the name of Reynold B. Johnson, now U.S. Pat. No. 4,541,028.

This invention pertains to a hand-held device for playing and/or recording upon sheets of stationary magnetic material carried by the device. More particularly this invention pertains to an improved device of the kind described in which means are provided for extending the playing time for a given record. This invention is particularly useful for playing magnetic sheets carried on the back side of a photograph.

In the past apparatus has been provided for transducing information with respect to a sheet of material. Devices generally of the kind described have typically employed a uniform track spacing across the record to be played. However, it has been observed that this arrangement provides only a limited amount of recording time for the record.

In general, there has been provided a hand-held transducing device for transducing information signals relative to a stationary record carried by the device on a sheet of material. A housing, small enough to be readily held in one hand, carries a transducing assembly for rotation therein to cause a transducer to define a record trace with respect to the record. Follower means serve to move the transducer to define the trace by movement along a stationary guide carried by the housing and defining a substantially annular guide path for engaging the follower. The guide path includes a gradually decreasing track spacing at progressively increasing radial displacement thereon while means supporting the transducer serve to position the transducer to be disposed at progressively smaller angles to the record path in response to progressively increased radial displacement of the transducer from the innermost track location so as to increase the recording time as explained below.

It is a general object of the present invention to provide an improved hand-held transducing device for playing and recording upon sheets of material carried in a stationary manner with respect to a moving transducer.

It is another object of the invention to provide such a transducing device in a manner whereby the playing time can be increased for each record.

Yet another object of the invention is to provide a handheld transducing device of the kind described characterized by means for readily resetting the transducer to an initial position.

A further object of the invention is to provide means associated with a hand-held transducing device whereby a sheet or a portion of a sheet can be properly registered with the trace defined by movement of the transducer.

Yet another object of the invention is to provide means for easily and reliably erasing previously recorded magnetic information from a sheet thereof.

The foregoing and other objects of the invention shall become more readily evident from the following detailed description of a preferred embodiment when considered in conjunction with the drawings.

FIG. 3 shows a diagrammatic perspective view partially broken away of a hand-held transducing device according to the invention;

FIG. 4 shows a diagrammatic perspective view also partially broken away showing means for supporting the transducer and guide follower;

FIG. 5 shows a diagrammatic perspective view from beneath the structure shown in FIG. 3;

FIG. 6 shows a diagrammatic perspective exploded view of a hand-held transducer assembly according to the invention;

FIG. 7 shows an enlarged detailed plan view partially in section of means for resetting the transducer assembly to an initial position;

FIG. 8 shows a diagram for purposes of illustration;

FIG. 9 shows a perspective view of means for holding a record sheet in stationary relation with respect to the moving transducer according to the invention;

FIG. 10 shows a diagrammatic plan view of the record holder shown in FIG. 9 for use in conjunction with two different types of record elements;

FIG. 11 shows a plan view of a record holder according to FIG. 9 as used in conjunction with a record applied to a portion of a larger card;

FIG. 12 shows a diagrammatic enlarged perspective detail view of that part of a hand-held transducer device employed for erasing information recorded magnetically upon the record element;

FIG. 13 shows an elevation detail section taken along line 13—13 of FIG. 2; and

FIG. 14 shows a diagrammatic perspective view of the assembly of an appropriate magnetic record sheet for use in the hand-held transducing device.

Figures 1, 2:
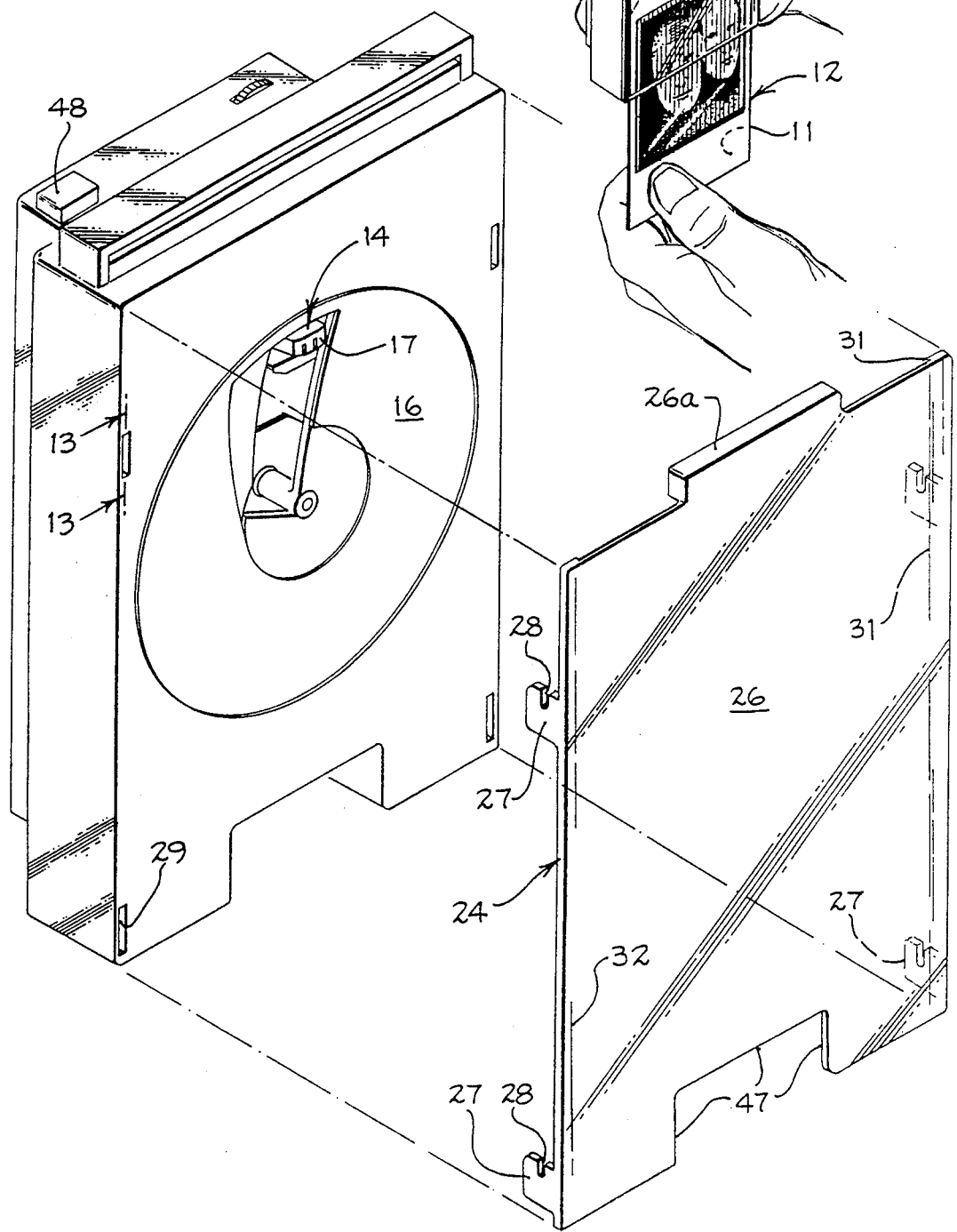
FIG. 1 shows a diagrammatic perspective view of a handheld transducing device being loaded with a sheet of record material.
FIG. 2 shows a diagrammatic perspective exploded view of a hand-held transducing device according to the invention and as shown in FIG. 1.

As shown in FIG. 1, a hand-held transducing device 10 hereinafter referred to as a magnetic player/recorder unit serves to record or play back information signals relative to a stationary magnetizable record surface 11 carried on the confronting face of a record card 12 or sheet.

One such record card 12 (FIG. 14) includes a substrate 15 for supporting a layer 20 of a magnetic record medium upon which information can be recorded. Suitable adhesive means (not shown) serves to retain layer 20 to substrate 15 to form record card 12.

Player/recorder unit 10 includes a housing 13 small enough to be readily held in one hand. A transducing assembly 14 carried by a rotatable body 16 includes a magnetic transducer 17 movable with body 16 during rotation thereof. Transducer 17 serves to follow a record trace defined upon the record surface 11 as explained below.

Thus, the manner in which transducer 17 is mounted for movement serves to cause transducer 17 to follow a predetermined record path on record surface 11. Thus, as shown best in FIG. 6, a bifurcated support arm 18, mounted to be carried by the rotation of body 16 and to pivot about axis 19 includes a follower stylus 21 for engaging a predetermined embossed spiral track 22 mounted in fixed relation to housing 13. The other arm of pivot arm 18 carries transducer 17. Rotation of body 16 causes stylus 21 to follow guide track 22 and transducer 17 to follow a related path on record surface 11.

Accordingly, track 22 defines a substantially annular guide path for engaging follower stylus 21 to move transducer 17 along its associated record trace.

As now to be explained and for reasons noted further below, the guide path followed by transducer 17 includes a gradually decreasing track spacing at progressively increasingly radially displaced portions thereof. Further, means serve to orient transducer 17 to be disposed at progressively lesser angles to the record trace in response to progressively increased radial displacement from the innermost track location. As noted below, the foregoing arrangement provides an increase in playing time for a given record size.

Thus, as shown in FIG. 8, a transducer 17' carried on a pivot arm 18' includes recording playback gaps 17a' disposed as arm 18' moves toward the outermost record track 11b, gaps 17a' are oriented at progressively lesser angles to the recorded trace.

It will be evident that the head to track velocity at outer track 11b will be greater than at inner track 11a. Due to the lower relative velocity between head and track when transducing inner track 11a it has been observed that gaps 17a' need to be disposed more normal to the track than if the speed were higher. However, by disposing transducer 17' with gaps 17a' normal to the track, the recorded trace of the head is of maximum width and requires maximum track spacing in order to avoid recording over (or playing back) information in an adjacent track. Permitting track spacing at the radially innermost portions of the record to dictate track spacing throughout the record has significantly limited the playing time of records of the general type disclosed herein.

As disclosed track spacing is progressively reduced under control of a fixed guide track 22 formed in a stationary guide disc 23. The angle of the transducing gaps of head 17 is progressively reduced at increasingly increased radial displacement.

Means for registering a record trace on surface 11 with respect to transducer 17 so as to cause transducer 17 to travel along the same trace each time a record card 12 is disposed adjacent thereto includes, as shown in FIG. 2, a transparent holder 24 formed of a planar sheet or panel 26 of transparent material formed with tabs 27 disposed substantially normal to the plane of panel 26. Tabs 27 each include a notch 29. As best shown in FIG. 13 tabs 27 are disposed to be inserted into slots 29. After all tabs are inserted into their associated slots 29, holder 24 can be moved upwardly as shown in FIG. 1 to cause notch 29 of each tab to engage the upper edge margin surrounding its associated slot 29.

Holder 24, in addition to and including panel 27 and tabs 27, includes mutually perpendicular registration means against which card 12 can be disposed. Thus, an elongate stop portion 26a carried by the upper end of panel 26 extends across the plane of panel 27 while lying along the edge. In addition, elongate strips 31, 32 formed on the reverse side of panel 26 extend along parallel sides of panel 26 substantially perpendicular to the orientation of stop portion 26a. As thus arranged when a record card 12 is inserted between the reverse surface of panel 26 and the front surface of the player/record unit 10 the card will abut the bottom edge of portion 26a and also one or both of strips 31, 32 so as to register card 12.

Means for driving body 16, best shown in FIG. 3, includes drive motor 33 coupled by a belt 34 to a reduction pulley 36. A bracket 37 carries an axle 38 supporting pulley 36 on one end and a flywheel 39 on the other. A small power takeoff pulley 41 rotates with pulley 36 to drive a belt 42 trained around the flanged sidewall of body 16.

One wall of a speaker cavity 43, best shown in FIG. 5, includes a grill 44 disposed across the front of a speaker 46. Cavity 43 permits the sound to readily escape from speaker 46 to prevent it from becoming muffled. In addition, when it is desired to remove a record card 12 from device 10 cavity 43 permits a person to readily insert a finger therein behind that portion of the record car disposed within an opening 57 formed in the bottom edge margin of panel 26.

Accordingly, as described above, by operation of a startstop button 48, motor 33 can be energized to rotate body 16 carrying pivot arm 18 and transducer 17 with it. In view of the fact that follower stylus 21 rides in the guide track 22, transducer 17 will follow a corresponding path traced on record surface 11. After the record has been played it is desirable to reset transducer 17 to its original outer position so as to be in position to play a subsequent record.

Accordingly, appropriate reset means have been provided as now to be described. Body 16 carries a flanged cap member 49 held to body 16 by means of three screws 51 (or other suitable fastening means) disposed through associated arcuate slots 52. Accordingly, cap member 49 is disposed to rotate with respect to body 16 between advanced and retracted positions for re-setting head 17. During play cap 49 and body 16 rotate together. Cap 49 includes a tab 53 extending normal to the plane of cap 49 as to be moved in an associated slot 54 by rotation of cap member 49.

Tab 53 extends sufficiently beyond the plane of cap member 49 so that tab 53 engages a portion of pivot arm 18 for moving the pivot arm and transducer 17 to the outermost track position.

A spring 56 extends between a stationary mount 60 and tab 53 to yieldingly return tab 53 (and cap 49) after cap member 49 is released.

Means for moving cap 49 from one position to another so as to reset transducer 17 is best shown in FIGS. 6 and 7. Thus, the sidewall 10a of unit 10 carries a reset button 57 coupled to the spring pawl 58. Pawl 58 is formed to bend downwardly out of the plane of a flat plate 68 for engaging one of the series of notches 59 formed in the flanged edge of cap member 49. In this way as button 57 is pushed in the direction of its associated arrow, pawl 58 will rotate cap member 49 in the same direction.

Means for holding body 16 against rotation during such movement of cap member 49 have been provided in view of the relatively limited resistance to rotation supplied to body 16 by virtue of the drive system.

Thus, a pivot arm 61 carries a lever 62 for movement therewith. The outer end of lever 62 engages a spring 63 coupled to a fixed mounting point 64 attached to the cover of device 10. Accordingly, spring 63 serves to bias pivot arm 61 counterclockwise as shown in FIG. 7. The distal end of arm 61 carries a brake shoe 66 movable into and out of engagement with the flanged portion of body 16.

In addition, pivot arm 61 carries a roller 67 whereby as reset button 57 is pushed forwardly in the direction of its associated arrow the end of plate 68 moves between roller 67 and the interior surface of sidewall 10a. This action forces pivot arm 61 toward the flanged side of body 16. In this manner brake shoe 66 can engage the outer surface of body 16 and hold it from rotating as cap member 49 is moved from a first to a second position so as to reset transducer 17.

As reset button 57 moves in a reverse direction pawl 58 will continue to engage its associated notch 59 thereby rotating cap member 49 in a reverse direction to return tab 53 to a position out of the path of pivot arm 18. In this manner pivot arm 18 will again be free to move from its reset position to the end of the recording trace. In addition, however, spring 56 can be employed to guarantee the foregoing return of tab 53 so as to prevent it from blocking or inhibiting movement of pivot arm 18. Ultimately, the reverse movement of pawl 58 causes the tip of pawl 58 to withdraw from its associated notch 59 of cap member 49 as shown in phantom lines at 58'.

A holder 71 for receiving and registering a predetermined information path of a record with respect to a transducer in a hand-held device of the kind described and as shown in FIG. 9 includes a transparent panel 72 of semi-rigid material supported in spaced relation to a transducer disposed therebehind. Holder 71 serves to receive a record card 12' or 12" from one or the other of two sides. Accordingly, holder 71 includes two sides 73 and 75 for supporting panel 72 thereon. Panel 72 is secured along two adjacent edges, i.e. 76, 77, so as to permit the "nearest" corner 72a (as shown in FIG. 9) to be lifted clear of side 75. Means for retaining holder 71 to player/recorder unit 10 inclues four studs 78 carried on sides 73, 75 and on end 74 disposed to project inwardly toward the housing 13 of unit 10.

An open passage or slit 79 has been formed by partially relieving the top edge of side 75 and relieving the edge margin of panel 72 correspondingly so as to permit a record card 12" to be moved sideways into the space defined between panel 72 and a transducer of the type described. Also a record card 12' can be inserted via passage 81 disposed substantially perpendicular to passage 79.

That part 72a of panel 72 disposed between the adjacent sides containing passages 79, 81 remains free to be lifted to admit a large sheet or record card 12''' as shown in FIG. 11. Accordingly, the magnetic record surface 11''' can be carried on a large card such as a greeting card or the like and by permitting the corner of panel 72 to be lifted the card can be inserted so as to properly position the record surface 11'''.

Means for registering a predetermined information path of a given record surface 11 with respect to a transducer carried by unit 10 includes means forming elongate mutually perpendicular abutments disposed opposite passages 79, 81 for engaging first and second mutually perpendicular edges of a sheet inserted beneath panel 72 and carrying a record surface 11 thereon. Thus, as shown in FIG. 9, the abutments are provided by a pair of elongate strips 82, 83 carried by the undersurface of panel 72 along adjacent edge margins thereof.

Finally, as shown in FIG. 12, means for erasing a magnetic surface 11 includes an elongate bar magnet 84 disposed in confronting relation to a magnetic record surface 11. Means such as the strap 86 serve to define a slot 87 adapted to permit a record card 12 or sheet to be passed therethrough while confined sufficiently closely to the magnet 84 to effect erasure of information magnetically recorded thereon.

From the foregoing it will be readily evident that there has been provided an improved hand-held transducing device for transducing information with respect to a magnetic record surface as carried on cards or other stationary magnetic record medium.

I claim:

1. In a hand-held transducing device for transducing information signals relative to a stationary record carried on a sheet of material, a housing small enough to be readily held in one hand, a transducing assembly within the housing including a rotatable body, transducer means carried by said body during rotation of said body for following a record trace defined on said record, follower means carried by said rotatable body to move with said transducer, stationary guide means lying in a plane disposed in spaced relation from the plane of said sheet of material carried by said housing to define a substantially annular guide path for engaging said follower means to move said transducer along said trace around said record when so engaged, said guide path having a gradually decreasing track spacing at progressively increasingly radially outwardly displaced portions thereof, and means for orienting said transducer to be disposed at progressively smaller angles to said path in response to progressively increased radially outward displacement of said transducer from the innermost track location.

2. In a hand-held transducing device according to claim 1 in which said rotatable body carries transducer reset means movable with respect to said body between first and second positions, a portion of said reset means engaging and moving said transducer means in response to movement of said reset means relative to said body.

3. In a hand-held transducing device for transducing information signals relative to a stationary record carried on a sheet of material, a housing small enough to be readily held in one hand, a transducing assembly within the housing including a rotatable body, a pivot arm carried by said body and a transducer carried by said pivot arm for following a record trace defined on said record, follower means carried by said rotatable body to move with said transducer, stationary guide means carried by said housing defining a substantially annular guide path for engaging said follower means to move said transducer along said trace around said record when so engaged, and reset means movable with respect to said body between first and second positions for engaging and moving said pivot arm to reset said transducer to a predetermined position on the record.

4. In a hand-held transducing device according to claim 3 including means serving to yieldingly retract said reset means from engagement with said pivot arm to permit said pivot arm to enable said transducer to freely advance along said trace.

5. In a hand-held transducing device according to claim 3 comprising means for inhibiting rotation of said body in response to operation of said reset means.

6. In a hand-held transducing device according to claim 3 further including means yieldingly moving said reset means to said first position after resetting said transducer.

7. In a transducing assembly for transducing information signals relative to a stationary record carried on a sheet of material disposed in a plane, said assembly comprising a housing for receiving the sheet, a rotatable body within the housing, a transducer carried to move with said body during rotation of said body and disposed to define an information trace on said sheet, follower means carried by said rotatable body to move with said transducer, stationary guide means lying in a plane and carried by said housing in confronting spaced parallel relation to the plane of the sheet, said guide means serving to define a substantially annular guide path for engaging said follower means to move said transducer along a record trace defined on said record when so engaged, said transducer being disposed between the planes of said sheet and said guide means.

* * * * *